(12) United States Patent
Van Curen et al.

(10) Patent No.: US 9,599,821 B2
(45) Date of Patent: Mar. 21, 2017

(54) VIRTUAL REALITY SYSTEM ALLOWING IMMERSION IN VIRTUAL SPACE TO CONSIST WITH ACTUAL MOVEMENT IN ACTUAL SPACE

(71) Applicants: Greg Van Curen, Fremont, IN (US); Minchul So, Torrance, CA (US); Samuel Farina, III, Crown Point, IN (US)

(72) Inventors: Greg Van Curen, Fremont, IN (US); Minchul So, Torrance, CA (US); Samuel Farina, III, Crown Point, IN (US)

(*) Notice: Subject to any disclaimer, the term of this patent is extended or adjusted under 35 U.S.C. 154(b) by 190 days.

(21) Appl. No.: 14/455,464

(22) Filed: Aug. 8, 2014

(65) Prior Publication Data

US 2016/0041391 A1 Feb. 11, 2016

(51) Int. Cl.

| | |
|---|---|
| *G06F 3/01* | (2006.01) |
| *G02B 27/01* | (2006.01) |
| *G06T 19/00* | (2011.01) |
| *H04N 13/00* | (2006.01) |
| *A63F 13/26* | (2014.01) |
| *A63F 13/211* | (2014.01) |

(Continued)

(52) U.S. Cl.
CPC ........ *G02B 27/0172* (2013.01); *A63F 13/211* (2014.09); *A63F 13/212* (2014.09); *A63F 13/213* (2014.09); *A63F 13/26* (2014.09); *G06F 3/011* (2013.01); *G06F 3/012* (2013.01); *G06F 3/013* (2013.01); *G06T 19/003* (2013.01); *G06T 19/006* (2013.01); *H04N 13/00* (2013.01); *G06F 2203/012* (2013.01)

(58) Field of Classification Search
CPC .. G02B 27/0172; G06T 19/003; G06T 19/006
See application file for complete search history.

(56) References Cited

U.S. PATENT DOCUMENTS 5,846,134 A 12/1998 Latypov
6,012,926 A 1/2000 Hodges et al.
(Continued)

FOREIGN PATENT DOCUMENTS

KR 1020100047563 5/2010
KR 1020120044461 5/2012
(Continued)

*Primary Examiner* — Jacinta M Crawford
*Assistant Examiner* — Jonathan M Cofino
(74) *Attorney, Agent, or Firm* — Taylor IP, P.C.

(57) ABSTRACT

A virtual reality system includes a playground defined within a real world space to have a predetermined area in which a user is movable, a head mounted device surrounds both eyes displaying an image of a virtual space formed corresponding to real objects in the playground, a sensor attached to a predetermined location in the playground, the head mounted device or body of the user sensing an actual location or motion of the user in the playground. A control unit calculates a location and direction of the user in the playground according to a signal from the sensor, and displays an image on the head mounted device of the virtual space, observed at the location and in the facing direction of the user. When the user wearing the head mounted device actually moves in the playground, a feeling of moving in the virtual space is given to the user.

12 Claims, 8 Drawing Sheets

(51) Int. Cl.
*A63F 13/213* (2014.01)
*A63F 13/212* (2014.01)

(56) References Cited

U.S. PATENT DOCUMENTS

| | | | |
|---|---|---|---|
| 6,388,657 B1 | 5/2002 | Natoli | |
| 6,559,813 B1 | 5/2003 | DeLuca et al. | |
| 8,206,218 B2 | 6/2012 | Gutierrez Novelo | |
| 2001/0031662 A1 | 10/2001 | Larian | |
| 2004/0252940 A1* | 12/2004 | Atac | G02B 27/0172 385/31 |
| 2010/0182340 A1 | 7/2010 | Bachelder et al. | |
| 2012/0242696 A1* | 9/2012 | Martin | G06F 3/011 345/633 |
| 2012/0242697 A1* | 9/2012 | Border | G02B 27/0093 345/633 |
| 2012/0287159 A1* | 11/2012 | Bett | A63F 13/06 345/633 |
| 2012/0293550 A1* | 11/2012 | Lo | G01C 21/20 345/633 |
| 2013/0083003 A1* | 4/2013 | Perez | G06F 3/005 345/419 |
| 2013/0128364 A1* | 5/2013 | Wheeler | A61B 3/113 359/630 |
| 2013/0182902 A1* | 7/2013 | Holz | G06K 9/3233 382/103 |
| 2013/0335407 A1* | 12/2013 | Reitan | G06F 3/011 345/419 |
| 2014/0306866 A1* | 10/2014 | Miller | G06T 19/006 345/8 |
| 2014/0335893 A1* | 11/2014 | Ronen | G01S 5/0252 455/456.1 |
| 2015/0323993 A1* | 11/2015 | Levesque | G02B 27/0172 345/156 |

FOREIGN PATENT DOCUMENTS

| | | |
|---|---|---|
| KR | 101333147 | 11/2013 |
| WO | 2012/026680 A2 | 3/2012 |

* cited by examiner

VIRTUAL REALITY SYSTEM ALLOWING IMMERSION IN VIRTUAL SPACE TO CONSIST WITH ACTUAL MOVEMENT IN ACTUAL SPACE

BACKGROUND OF THE DISCLOSURE

Field of the Disclosure

The present disclosure relates to a virtual reality system.

Description of the Related Art

A virtual reality system generally includes an output device for displaying a virtual space to a user, an input device for receiving a motion of the user, and a control device (computer) for changing the virtual space by reflecting the motion of the user input from the input device thereto and displaying the changed visual space to the output device.

The output device is generally a display device which allows a virtual space to be felt through the sense of sight of a human. The output device may be a computer monitor (screen), which is the simplest example, and may also employ a surrounding screen or a head mounted device to enhance the immersion. The head mounted device is generally worn on the head to surround both eyes of a user. The head mounted device includes displays respectively at the front of both left and right eyes and displays a left eye image and a right eye image respectively on the left and right displays so that a three-dimensional image may be naturally displayed. In particular, in case of the head mounted device, since a user may view only a virtual space, which is a three-dimensional image, implemented by the left and right eye images, the user feels as if he/she is actually in the virtual space, and thus the immersion in a virtual space is more excellent in comparison to any other output device.

In addition, the output device may further include a stereo speaker for giving sounds so that the virtual world may be felt through the auditory sense of a human (sounds may be provided only to the user through an earphone), and may also further include an air blower or a sprayer for giving olfactory or touch stimulations such as wind, fog and smell to enhance the reality of the virtual world.

The input device is used for detecting a motion of the user when the user moves in an actual space for the motion or movement in a virtual space. The input device may use not only simple computer input devices such as a keyboard, a mouse and a joystick but also various devices such as a camera sensor separated from the user to photograph the user, a motion sensor such as an acceleration sensor attached to a body of the user to sense a motion of the user, and a specially designed device such as treadmill or a sensor-mounted chair or vehicle, which allows the user to walk or move on the spot and senses the walking or motion of the user.

However, even though any of such various output devices and input devices is used, in the virtual reality systems which have been developed until now, the user cannot make actual movement such as walking or running in an actual space. It is because that if a simple monitor or a surrounding monitor is used as the output device, the monitor should be fixed to a specific location, and therefore the user cannot play a game unless he/she is at the front of the monitor. In addition, if the head mounted device is used as the output device, the user may freely move theoretically since the display is always at the front of the user even though the user moves in the actual space. However, in this case, the user is able to watch only a virtual space displayed by a display of the head mounted device and is not able to watch the ground or obstacle in a real world (actual space) out of the head mounted device. Therefore, even in this case, the user cannot actually walk or run.

Therefore, the virtual reality system using a head mounted device which has been developed until now just uses an input device such as a specific chair or vehicle which allows a user to make a motion just on the spot, but such an input device does not reflect a feeling of walking or moving of the user in the actual space, which deteriorates the fun and reality of a game and is also not sufficiently helpful for actual exercise or training of the user.

Meanwhile, a device having a small display for displaying information at the front of the eye of a user so that the user may watch the information provided by the display together with a real world has been proposed, for example 'Google glass' recently released. If this device is used as the output device, a user may make active movement such as walking and running since the user may watch the ground and obstacles in the actual space. However, even though the Google glass is useful for watching auxiliary information in addition to a real world seen by the user, a system using the Google glass gives very deteriorated immersion in a virtual space (when the auxiliary information is regarded as an image of the virtual space) in comparison to the above head mounted device, and thus the Google glass cannot be regarded as a true virtual reality system.

Here, the Google glass may also be regarded as a head mounted device since it is worn on the head, but in this specification, the 'head mounted device' just means a device capable of showing only a virtual space, and this will also be called a 'immersive' head mounted device if it should be distinguished from a device such as a Google glass capable of showing auxiliary information in addition to a real world.

In a virtual reality system which has been developed until now, it is impossible to allow the immersion in a virtual space to consist with an actual movement of a user in an actual space.

SUMMARY OF THE DISCLOSURE

The present disclosure is directed to providing a virtual reality system, which may allow the immersion in a virtual space to consist with an actual movement in an actual space by allowing a user to feel as if he/she actually moves in a virtual space when the user actually moves in an actual space.

In an aspect, the present disclosure provides a virtual reality system, which includes a play ground defined within an actual space of a real world to have a predetermined area in which a user is actually movable; a head mounted device having a display for displaying an image of a virtual space formed corresponding to real objects in the play ground and worn by the user to surround both eyes; at least one sensor attached to a predetermined location in the play ground, the head mounted device and/or a body of the user to sense an actual location and/or motion of the user in the play ground; and a control unit for calculating an actual location and a facing direction of the user in the play ground according to a signal received from the at least one sensor, and controlling the head mounted device to display an image of the virtual space, observed at the actual location and in the facing direction of the user, on the display, wherein when the user wearing the head mounted device actually moves in the play ground, a feeling of actually moving in the virtual space is given to the user.

Here, the control unit may control the head mounted device to further display an image of a virtual object, not present in the play ground, to the image of the virtual space displayed on the display, and the virtual object may be a virtual character which interactively moves by means of conversation with the user, education, training, fight, and/or combat or a virtual exhibit fixed to a predetermined location in the virtual space.

In addition, the control unit may be implemented by a computer separated from the user and be electrically connected to the at least one sensor by means of wireless communication.

Moreover, the control unit may be implemented by a computer possessed or worn by the user. Further, the control unit may be implemented by a smart phone possessed or worn by the user, and the at least one sensor may be included in the smart phone.

In addition, the at least one sensor may include an acceleration sensor or a gyro sensor mounted to the head mounted device, and the control unit may calculate an actual location and a facing direction of the head mounted device according to a signal input from the acceleration sensor or the gyro sensor.

Moreover, the at least one sensor may include a camera sensor installed at a predetermined location in the play ground, and the control unit may calculate an actual location and a facing direction of the head mounted device according to an image photographed by and input from the camera sensor.

Further, the at least one sensor may include an emission element mounted to the head mounted device to emit an electromagnetic wave of a predetermined wavelength; and at least two detection elements installed at predetermined locations in the play ground to detect the electromagnetic wave. In this case, the emission element may include two emission elements spaced apart from each other by a predetermined distance, the at least two detection element may respectively sense locations of the two emission elements by detecting both of electromagnetic waves emitted from the two emission elements, and the control unit may calculate locations of the two emission elements, respectively, according to signals input from the at least two detection elements, calculate a center point of the locations of the two emission elements as a current location of the head mounted device, and calculate a direction of a perpendicular bisector at the locations of the two emission elements as a current facing direction of the head mounted device.

In addition, the at least one sensor may include a plurality of motion detection sensors respectively attached to a plurality of body portions of the user.

Moreover, the display may include a left eye display and a right eye display respectively corresponding to both left and right eyes of the user, the left eye display may display a left eye image which is an image obtained when the left eye of the user sees the virtual space, and the right eye display may display a right eye image which is an image obtained when the right eye of the user sees the virtual space, respectively.

In this case, the head mounted device may include an eye tracking unit for detecting the pupil of the user, and the control unit may calculate a location of the pupil of the user according to a signal input from the eye tracking unit, calculate a gazing point which is currently gazed by the user therefrom, and control the head mounted device to display on the display an image in which the gazing point is focused.

According to the present disclosure, since a user may utilize abundant virtual objects in a virtual world while actually moving in an actual space, it is possible to provide a new-generation entertainment system where the immersion in a virtual space may consist with the actual movement in an actual space. Other additional features and advantages of the present disclosure will be more clearly understood from the following detailed description.

DESCRIPTION OF THE PREFERRED EMBODIMENT

Hereinafter, preferred embodiments of the present disclosure will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

In the related art described above, the immersion in a virtual space has not consisted with an actual movement in an actual space because a user is not able to see a real world in a state of wearing an immersive head mounted device. In other words, a human learns to set foot while sensing a real world, particularly in a visual way (more preferably, by means of a three-dimensional vision), but the head mounted device blocks the vision for the real world. Therefore, a general virtual reality system, which includes a head mounted device worn by a user so that the user may immerse in a virtual space and play a game, just allows the user to move on the spot.

In the present disclosure, a user may utilize abundant virtual objects (for example, virtual enemies or virtual exhibits) provided in a virtual world while actually moving in an actual space. In order to allow the immersion in a virtual space to consist with the actual movement in an actual space as described above, the virtual space displayed on a display of the head mounted device should be visually recognized by the user with the same size and visual field as the actual space. Detailed means and methods for this will be described later, and specific embodiments of the virtual reality system according to the present disclosure will be described first.

The virtual reality system of the present disclosure may be very suitably implemented as an entertainment system, without being limited thereto. Here, the 'entertainment system' using virtual reality in the present disclosure includes a system in which any kind of feeling perceivable by a user who is moving in a real world, for example game, exercise, education/training, viewing or the like can be reproduced in a virtual space.

Figure 1:
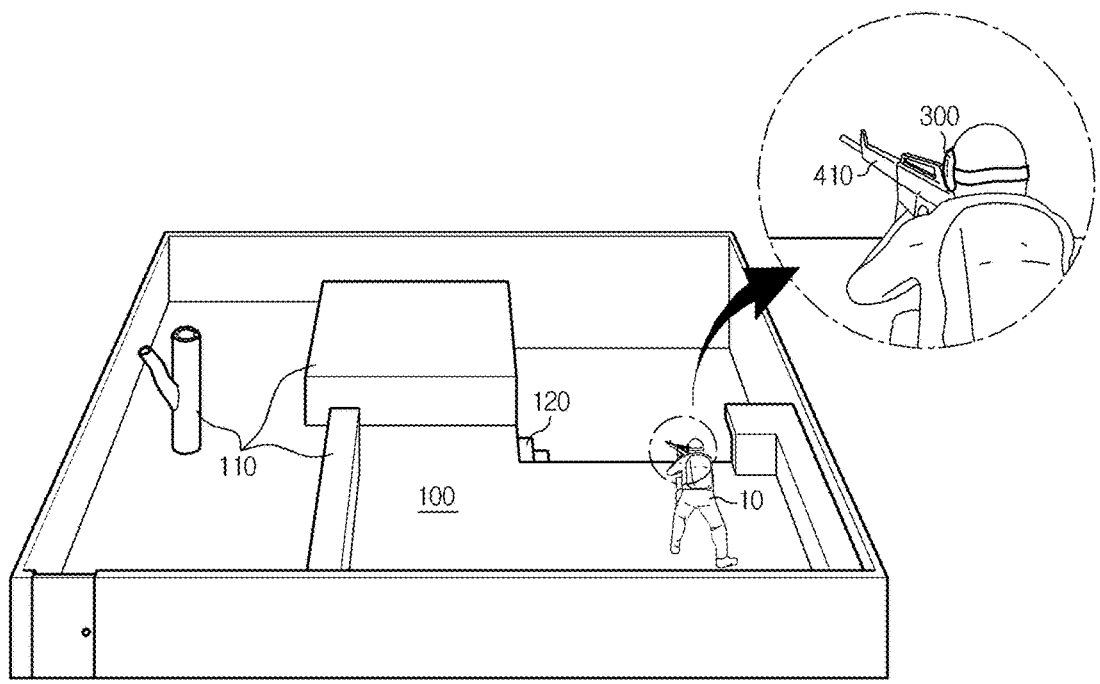
FIG. 1 is a schematic perspective view showing a configuration of a real world in a virtual reality system according to an embodiment of the present disclosure.

FIG. 1 is a schematic perspective view showing a virtual reality system according to the present disclosure in a real world, which is applied to a survival game or shooting game system.

The virtual reality system according to an embodiment of the present disclosure as depicted in FIG. 1 includes a play ground 100 with a predetermined area (for example, several meters in length and width) where a user 10 is actually movable, in an actual space of the real world. Here, the play ground 100 may use an existing survival game ground intactly, or the play ground 100 may also use an unhampered flatland having no or minimal obstacles 110. Even though the play ground 100 is configured as a ground with no obstacle, the present disclosure may utilize virtual objects of a virtual space, displayed on the display of the head mounted device 300, as desired, which gives fun and exercise effects close to or superior to an actual survival game. However, the play ground 100 may have an obstacle 110 at which the user 10 may hide or lean his/her body, in the nature of the survival game, and may further have a structure such as an unevenness or step 120 or a layered structure, instead of a flatland.

Figure 2:
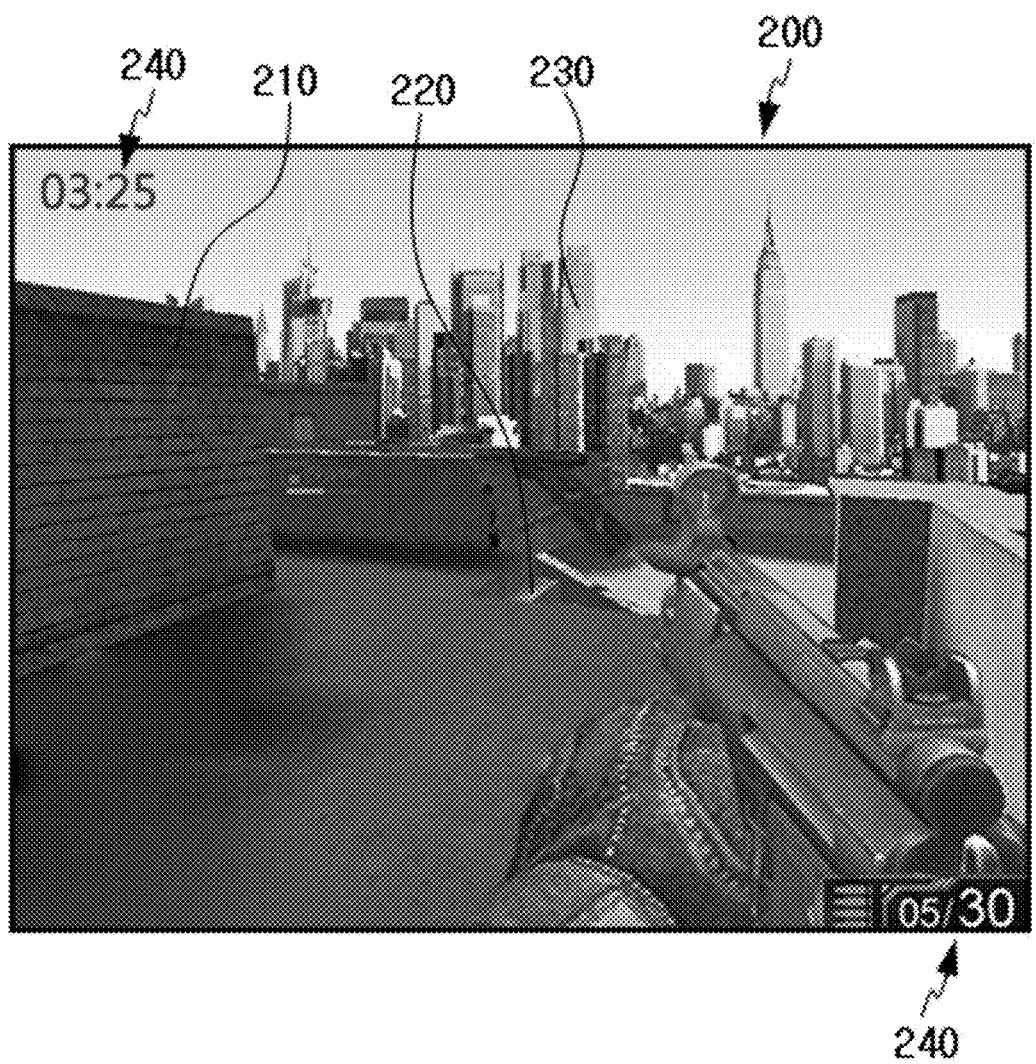
FIG. 2 is a diagram showing an example of an image of a virtual space displayed on a display in a head mounted device employed in the system of FIG. 1.

FIG. 2 shows an example of an image of a virtual space 200 displayed on the display of the head mounted device 300 when a user stands at a location and in a direction as shown in FIG. 1 in the play ground 100. Here, the virtual space 200 is constructed with the same structure as an actual space to correspond to the actual space, namely real objects (a ground structure, obstacles or facilities) 110,120 in the play ground 100 (a method for constructing the virtual space 200 will be described later). However, as shown in FIG. 2, even though the actual space 100 and the virtual space 200 have the same basic structure, virtual objects 210, 220, 230 are much more diverse than the real objects 110,120, fixed virtual objects (for example, buildings 230 serving as a background in FIG. 2) not present in the actual space 100 are further present. Moreover, though not shown in FIG. 2, a moving virtual character (for example, a virtual enemy or friendly solder) may be further present as a virtual object.

In addition, in the virtual space 200 displayed on the display of the head mounted device 300 worn by the user 10, virtual objects 210,220 corresponding to real objects 110, 120 which are observed by the user 10 at a current location in a current direction in the actual space 100 are displayed in the current direction with a size proportional to a distance in the actual space 100 (this displaying method will be described later). In other words, if the user turns his/her head right or left or raises or lowers his/her head, virtual objects 210,220 corresponding to real objects 110,120 such as the ground or obstacle present in the gazing direction of the user in the actual space 100 are displayed at the center of the display. Therefore, the user may move, for example naturally walk or run, while visually recognizing the ground and the virtual objects 210,220 in the virtual space 200 as if they are the real ground and the real object 110,120 in the actual space 100. If the user 10 moves in the play ground 100 serving as an actual space as described above, a changed current location and a changed current gazing direction of the user are calculated by means of a sensor, described later, and an image of the virtual space 200 corresponding to the changed location and direction of the user is displayed on the display.

Further, the user may enjoy a game by shooting with a gun held by his/her hand if a virtual enemy appears in the virtual space 200. Of course, the user actually holds a sensor 410 for sensing a shot. For better reality, a switch having a trigger shape and a sensor for sensing a facing direction of a gun may be attached to a toy gun so that a current facing direction of the gun is displayed as an aiming point in the virtual space 200. If so, the user aims and shoots at a virtual enemy by using the aiming point, and it is programmed that the virtual enemy falls down if the aiming point is identical to the virtual enemy, which may enhance fun and reality of the game. Further, information 240 showing a current state of the game, for example a remaining game time, the number of remaining bullets, the number of remaining enemies, the number of falling-down enemies, whether or not to be shot, a score or the like, may be displayed at a predetermined location in the image of the virtual space 200 on the display.

Figure 3:
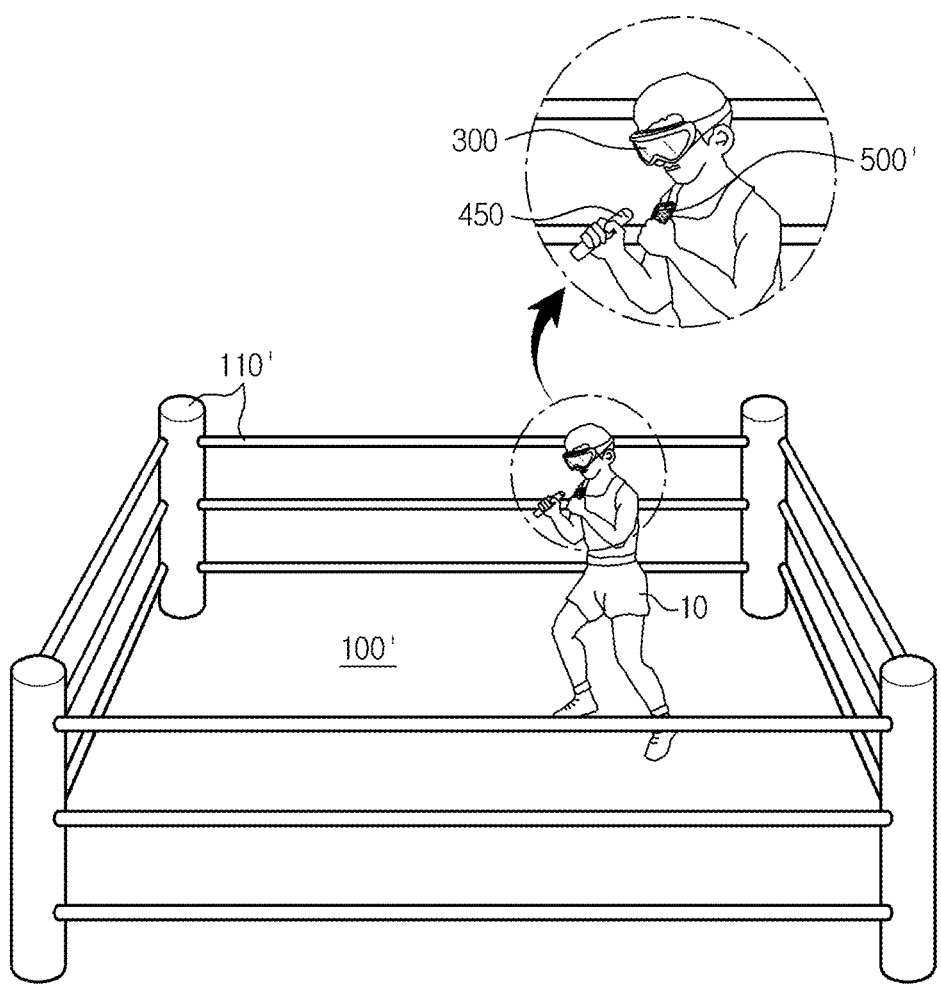
FIG. 3 is a schematic perspective view showing a configuration of a real world in a virtual reality system according to another embodiment of the present disclosure.

FIG. 3 is a schematic perspective view showing a virtual reality system in a real world according to the present disclosure, which is applied to a boxing game system.

In the virtual reality system according to the embodiment depicted in FIG. 3, a play ground 100' is implemented as a ring similar to a rectangular ring used in an actual boxing game. In this embodiment, the play ground may use an actual boxing ring, and the play ground may also use a simple flatland on which real objects 110' such as poles and ropes are implemented as virtual objects 210'.

Figure 4:
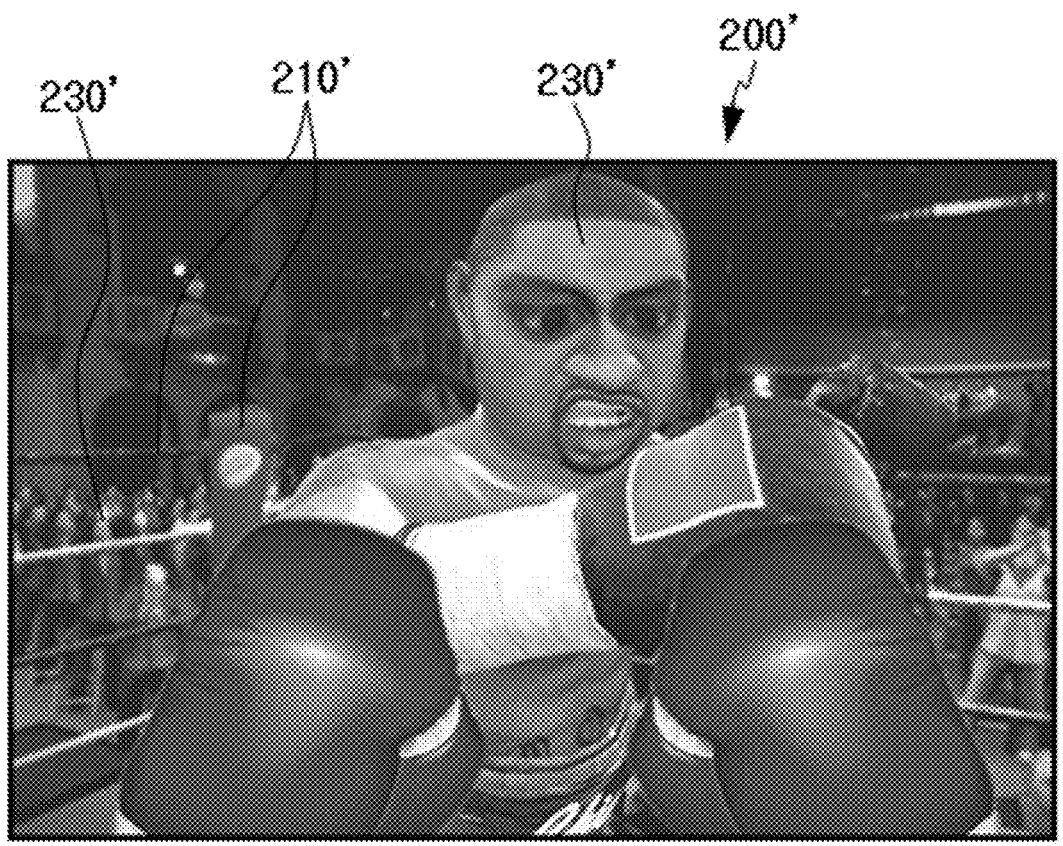
FIG. 4 is a diagram showing an example of an image of a virtual space displayed on a display in a head mounted device employed in the system of FIG. 3.

FIG. 4 shows an example of an image of a virtual space 200' displayed on the display of the head mounted device 300 when the user stands in the play ground 100'. In this example, the virtual space 200' is also constructed with the same structure as an actual space, namely corresponding to real objects 110' (a floor, poles, ropes or the like) in the play ground 100'. However, similar to the former embodiment, the virtual space 200' has the same basic structure as the actual space 100' but is much more diverse, and a moving virtual character 230' such as an opponent or spectators, which is not present in the actual space 100', may be further present in the virtual space 200'. In particular, an opponent serving as the virtual character 230' may interactively move according to a motion or movement of the user 10, and the user may select an opponent suitable for his/her level.

In addition, in this embodiment, in the virtual space 200' displayed on the display of the head mounted device 300 worn by the user 10, virtual objects 210' corresponding to real objects 110' which are observed by the user 10 at a current location in a current direction in the actual space 100' are displayed in the current direction with a size proportional to a distance in the actual space 100', and the image of the virtual space 200' is changed to be synchronized with a motion or movement of the user. Therefore, the user may naturally step or move while visually recognizing the ground and the virtual objects 210' in the virtual space 200' as if they are the real ground and the real object 110' in the actual space 100'.

However, the opponent serving as the virtual character 230' in this embodiment is a virtual object in the actual space 100'. Therefore, even though the user 10 hits the opponent 230' or is hit by the opponent 230', the user is not able to feel a hitting or hit feeling. However, similar to the former embodiment in which a virtual enemy hit by the user falls down, a punch accuracy rate or the like is calculated in consideration of a location and speed of the fist of the user 10, sensed by the sensor 420, and a location of the opponent 230', and it may be programmed that an image showing that the opponent 230' falls down is displayed accordingly. In addition, similar to the former embodiment, current state information showing a hitting or hit punch accuracy rate, a current round, a remaining time or the like may be displayed at a predetermined location in the image of the virtual space 200', which may enhance fun and reality of the game.

As described above, if the virtual reality system of the present disclosure is used, the user may utilize abundant virtual objects in a virtual space while making an actual movement or motion in an actual space, which enables a new-generation entertainment system where virtual reality is combined with the real world. In particular, even though an existing game allows a user to play a game while sitting on a chair or making a motion on the spot, which results in shortage of exercise and abnormal emotion of children or youths who need suitable exercise for body development, the present disclosure allows a user to actually exercise while being entertained.

Figure 5:
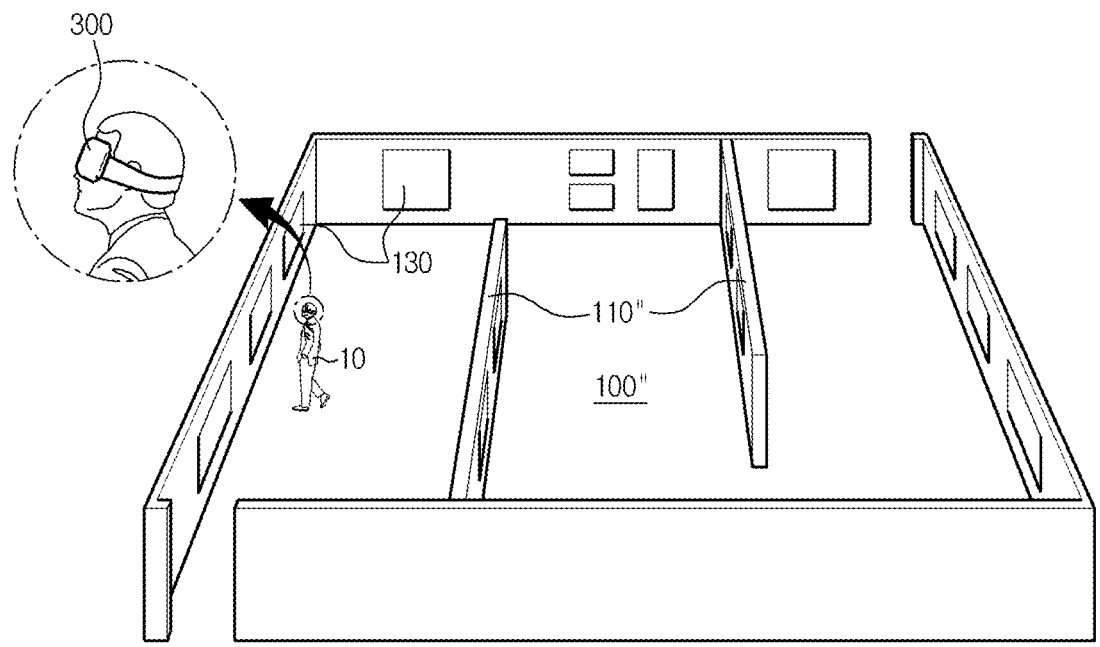
FIG. 5 is a schematic perspective view showing a configuration of a real world in a virtual reality system according to another embodiment of the present disclosure.

FIG. 5 is a schematic perspective view showing a virtual reality system in a real world according to the present disclosure, which is applied to a virtual exhibition system.

In the virtual reality system according to the embodiment depicted in FIG. 5, a play ground 100" is implemented as an exhibition center. In this embodiment, the play ground may utilize an actual exhibition center, and the play ground may also be implemented by imitating only a building structure of a popular museum or gallery. Further, different from the former embodiments, an extreme movement is not expected in this embodiment, and thus the play ground may be implemented as a simple flatland with no special border or real object 110". Meanwhile, in FIG. 5, a reference symbol 130 is a location where a virtual exhibit is to be posted in a virtual space, and this location 130 may be distinguishably present on a wall 110" in the actual play ground 100" or may not be actually present.

In this embodiment, though not shown in the figure, an image of a virtual space is displayed on the display of the head mounted device 300 according to a current location and direction of the user 10. In the virtual space, a virtual object corresponding to the wall 110" of the actual space 100" and a virtual object serving as a virtual exhibit to be posted are displayed at given locations 130. Here, the virtual exhibit may be selected by the user from collections in a popular museum or gallery. In addition, a docent or other spectators may also be displayed as virtual characters.

In addition, in this embodiment, in the virtual space displayed on the display of the head mounted device 300 worn by the user 10, virtual objects corresponding to real objects 110",130 which are observed by the user 10 at a current location in a current direction in the actual space 100" are displayed in the current direction with a size proportional to a distance in the actual space 100", and the image of the virtual space is changed to be synchronized with a motion or movement of the user. Therefore, the user may naturally move in the exhibition center (actually, the play ground 100") and watch virtual exhibits while visually recognizing the ground and the virtual objects in the virtual space as if they are the real ground and the real object 110" in the actual space 100".

As described above, if the virtual reality system of the present disclosure is used, the user may utilize abundant virtual exhibits while actually moving in a popular museum, gallery or fairground, where the user cannot go, by means of a virtual reality system, which enables a new-generation exhibition and viewing system where virtual reality is combined with the real world beyond the limit in time and space.

Subsequently, detailed components of the virtual reality system according to the present disclosure as well as means and method for configuring the system of the present disclosure will be described in detail with reference to FIG. 6.

Physical components of the virtual reality system according to the present disclosure are generally classified into play ground 100, 100', 100", a head mounted device 300, at least one sensor 400, and a control unit 500. Here, the play ground 100, 100', 100" has already been described above, and the following description will be focused on other components.

Meanwhile, the head mounted device 300, at least one sensor 400, and the control unit 500 may not be physically divided from each other, but as described later, they may be integrally included in or attached to a single device. In other words, these components are logically distinguished.

The head mounted device 300 is worn by the user 10 to surround both eyes, and a display for displaying an image of the aforesaid virtual space 200,200' is provided in the head mounted device 300 at a location corresponding to both eyes of the user. Therefore, if the user 10 wears the head mounted device 300, the user is not able to see real objects in the real world other than the image displayed on the display.

The display may be divided into a left eye display and a right eye display provided at locations respectively corresponding to both left and right eyes of the user. If so, the left eye display displays a left eye image which is an object image seen by the left eye of the user, and the right eye display displays a right eye image which is an object image seen by the right eye of the user, respectively. Therefore, without any special means such as special glasses for watching a three-dimensional image by means of a shutter or filter or a lenticular sheet attached to a surface of the display, a three-dimensional display may be provided conveniently. Such a head mounted device 300 is easily available and widely known in the art, and thus its basic configuration will not be described in detail here.

Meanwhile, the head mounted device 300 may further include an earphone and/or microphone, like a general headset, to give an audio effect (sound) to the user in addition to a visual effect or to receive a voice of the user so that the user may make a conversation with a virtual character or inputs a command to the system by voice.

The sensor generally designated by a reference symbol 400 may be configured in various ways according to a specific application, but basically a sensor for sensing a current location and a facing direction (a direction in which the user gazes) of the user 10 in the play ground 100, 100', 100" is required.

Figure 6:
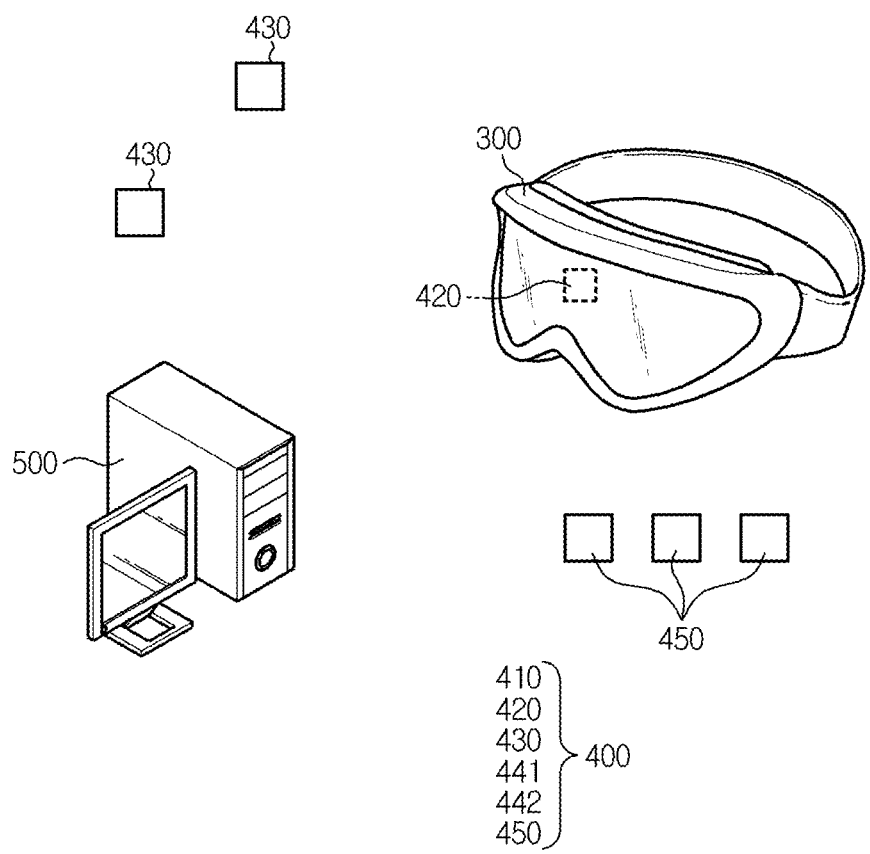
FIG. 6 is a schematic diagram showing the virtual reality system depicted in FIG. 1, 3 or 5.

A simplest sensor for sensing a location and direction of the user is an acceleration sensor or gyro sensor 420 included in or attached to the head mounted device 300 as shown in FIG. 6. The acceleration sensor senses an acceleration of the head mounted device 300 when the head mounted device 300 moves according to a motion of the user 10, and a current location and a facing direction of the user 10 in the play ground 100, 100', 100" may be calculated by using the acceleration sensor. In detail, if the head mounted device 300 moves, the acceleration sensor may sense its acceleration, decompose the acceleration into x-, y- and z-axis components, and generate signals therefore. If they are integrated, velocities in x-, y- and z-axis directions may be calculated, and if they are integrated again, a current location of the head mounted device 300, namely coordinates on a x-, y- and z-axes based on an origin point (an initial location, for example, an entrance of the play ground 100,100" in FIGS. 1 and 5 and a specific corner of the boxing ring of the play ground 100' in FIG. 3) may be obtained. In addition, since the acceleration and velocity are vectors having a magnitude and direction, if a movement history from the origin point to the current location is traced, the direction in which the head mounted device 300 is currently facing, namely the direction in which the user gazes, can be calculated. Meanwhile, the gyro sensor measures an angular momentum or an angular velocity of the head mounted device 300 rotated based on the rotation axes (x-, y-, and z-axes) and outputs them as electric signals. Similar to the acceleration sensor, the gyro sensor also allows a current location and a facing direction of the user, namely the head mounted device 300, to be calculated.

For this, when the user 10 stands at the origin point to face the front or a predetermined direction, an initializing process, namely a calibration process for harmonizing a coordinate axis of the actual space with a coordinate axis of the acceleration sensor or gyro sensor 420, should be performed. This initializing process and the user current location and direction calculating process are performed by the control unit 500 using a signal from the acceleration sensor or gyro sensor 420.

In order to sense a current location and direction of the user, a camera sensor 430 may also be used. At least one camera sensor 430 may be installed at a specific location in the play ground 100, 100', 100", and preferably, a plurality of camera sensors are installed for accurately sensing a location and direction in consideration of dead zones of the play ground. The camera sensor 430 photographs an image within its vision field and sends the image to the control unit 500. If so, the control unit 500 recognizes the user and the head mounted device 300 from the image received from the camera sensor 430 and calculates a current location of the head mounted device 300 in the play ground 100, 100', 100" from the location, size and shape in the image. This process is performed using an image recognition algorithm, and the image recognition algorithm is already widely known in the art and thus not described in detail here.

Figure 7:
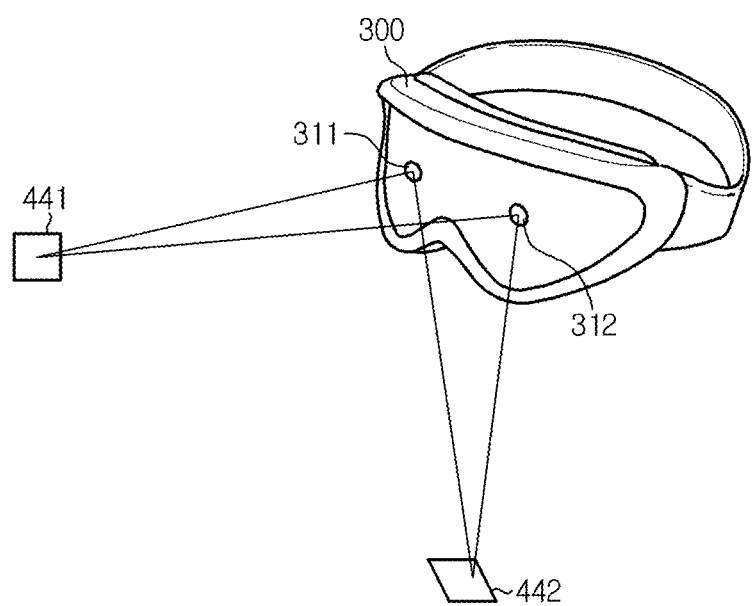
FIG. 7 is a diagram showing another example of a sensor employed in the virtual reality system according to an embodiment of the present disclosure.

As another example of the sensor for sensing a current location and direction of the user, as shown in FIG. 7, an emission element 311,312 mounted to the head mounted device 300 to emit an electromagnetic wave of a specific wavelength (typically, infrared ray) and at least two detection element 441,442 installed at predetermined locations in the play ground 100, 100', 100" to detect the electromagnetic wave (infrared ray) emitted from the emission element 311,312 may be used. Here, the emission element may include two emission elements 311,312 respectively mounted to locations on an outer surface of the head mounted device 300, which approximately correspond to both eyes of the user. In addition, two detection elements 441,442 respectively detect electromagnetic waves emitted from two emission elements 311,312 and respectively sense locations of two emission elements 311,312 therefrom. If so, the control unit 500 may receive the signals from the detection element 441,442 to calculate locations of two emission elements 311,312, calculate a center point of the calculated locations of two emission elements 311,312 as a current location of the head mounted device 300, and calculate a direction of a perpendicular bisector at the locations of the two emission elements 311,312 as a current facing direction of the head mounted device 300, namely a direction in which the user is gazing.

Meanwhile, any one of the sensors 420, 430, 441, 442 may be independently utilized, but two or more kinds of sensors may also be combined to enhance the sensing accuracy, depending on applications.

If the actual location and the facing direction (the gazing direction) of the user 10 in the actual space 100, 100', 100" is calculated using the sensor 420, 430, 441, 442 as described above, virtual objects in the virtual space 200,200' located in the current gazing direction from the current location, which corresponds to the actual location and the facing direction in the actual space 100, 100', 100", are displayed on the display of the head mounted device 300, so that the user 10 may feel as if he/she is actually present in the virtual space 200,200' corresponding to the actual space 100, 100', 100". In addition, if the user moves in the actual space 100, 100', 100", the user may feel as if he/she also moves in the virtual space 200,200'.

In the virtual exhibition system depicted in FIG. 5, the user 10 just walks and views virtual exhibits. Therefore, the sensor 420, 430, 441, 442 which calculates an actual location and a facing direction of the user 10 in the actual space 100", may be sufficient as the sensor 400 for the system of FIG. 5. However, in the systems depicted in FIGS. 1 to 4, the user 10 should make active motions (a shooting motion in FIG. 1, a punching motion in FIG. 3, or the like) to play a game in addition to simple viewing. Therefore, these systems further require a sensor for sensing such a behavior or motion of the user.

A sensor for sensing a behavior or motion of the may utilize the sensor 410 which is used for sensing a shot in the system of FIG. 1 and a sensor capable of sensing a facing direction of a gun. In addition, the motion sensor 450 as shown in FIGS. 3 and 6 may also be utilized. The motion sensor 450 may be implemented using the acceleration sensor or gyro sensor described above. The motion sensor 450 may sense a hand motion or a physique motion of the user 10 if the user 10 grips the sensor or wears the sensor on a plurality of joints as shown in FIG. 3, and the sensed motion of the user may be reflected to change a behavior of a virtual character (for example, the virtual opponent 230' in FIG. 4).

The control unit 500 may be generally implemented using a computer separated from the user 10 and installed in or out of the play ground 100, 100', 100". Here, the computer means an information processing device including at least a processor, a memory, and an I/O interface. The control unit 500 implemented using the computer stores information and data in relation to the virtual space of the virtual reality system according to the present disclosure in a memory along with game program or the like, and executes the game program by means of the processor so that the user 10 may enjoy the virtual reality system according to the present disclosure. In detail, the control unit 500 receives signals from the sensor 400 to calculate an actual location and a facing direction of the user 10 in the play ground 100, 100', 100", and controls the head mounted device to display an image of the virtual space 200,200', observed at the actual location and in the facing direction of the user, on the display of the head mounted device 300. In addition, the control unit 500 displays virtual objects such as virtual characters or virtual exhibits on the display according to the program, senses a motion of the user 10 by receiving signals from the sensor 410,450, and displays an image of the virtual object changed corresponding thereto on the display.

If the control unit 500 is implemented using a separated computer as described above, the I/O interface of the control unit 500 for communication with the head mounted device 300 or the sensor 400 may be implemented by means of wireless communication in order to ensure free movement of the user 10. The wireless communication may utilize WLAN (wireless local area network), infrared communication or the like, widely known in the art.

In addition, if high-speed mass data transmission is impossible in the wireless communication, the control unit 500 may be implemented as a portable computer possessed or worn by the user 10 (for example, a portable computer put into a backpack and carried on the user's back). In this case, the control unit 500, the head mounted device 300 and sensor 400 may be connected by means of wires which allows high-speed mass data transmission.

Further, as shown in FIG. 3, the control unit 500 may also be implemented as a smart phone 500' possessed by the user. In other words, the smart phone including a memory, a processor, and an I/O interface may be substantially regarded as a computer, and this may serve as a control unit for controlling a virtual reality system composed of a relatively small-capacity program and data, in some applications. In this case, an acceleration sensor or gyro sensor recently included in the smart phone 500' may be utilized as the sensor 450. In addition, the virtual reality system of the present disclosure may be implemented by connecting an additional sensor 450 (see FIG. 3) or the head mounted device 300 by means of a wired or wireless interface and installing a necessary application program in the smart phone 500'.

In addition, other physical components of the virtual reality system according to the present disclosure may include an earphone, a speaker, a microphone, an air blower, a sprayer or the like, as described above. In addition, the user may wear a special cloth to which piezoelectric elements or vibration motors are attached so that the user may feel a hit feeling in a fighting or combat game such as a shooting game or a boxing game.

Next, a method for constructing the virtual space 200, 200', which is essential in virtual reality system of the present disclosure, will be described.

The virtual reality system of the present disclosure includes the play ground 100, 100', 100" which is a real world, and the user 10 walks or runs in the play ground 100, 100', 100" without watching the actual space. Therefore, except for a case where a flatland having no border is used as a play ground, real objects 110, 110', 120 such as obstacles in the play ground 100, 100', 100" should be displayed as corresponding virtual objects 210', 220' in the virtual space 200, 200'.

Therefore, in a first step for constructing the virtual space 200, 200', a frame of the virtual space 200, 200' having the same structure and size as the play ground 100, 100', 100", which is an actual space, is constructed. In the step of constructing a frame of the virtual space 200, 200', if the display of the head mounted device 300 respectively displays both left and right eye images so that the virtual space is displayed as a three-dimensional stereoscopic image, a method for constructing three-dimensional stereoscopic image data may be used.

In detail, the play ground 100, 100', 100" is scanned to obtain depth information of the actual space and thus get a depth map therefrom. A most general method for obtaining depth information of the actual space is a stereo matching method which uses images obtained by scanning the play ground 100, 100', 100" with two cameras. In the stereo matching method, disparity information between pixels corresponding to the same object in two images is obtained to get depth information of real objects. As another general method for obtaining depth information of the actual space, a distance between a camera and an object in the actual space may be directly measured to obtain a depth map of the actual space. In other words, the play ground 100, 100', 100" is scanned by using a depth camera which emits infrared ray or optical signals to an object, and a distance between the depth camera and the object, namely depth information, is obtained from a phase difference of signals reflected and returned.

After the depth map of the play ground 100, 100', 100", which is an actual space, is obtained in this way and a frame of the virtual space is constructed, objects present in the frame (they are still real objects) are corrected and rendered, thereby generating virtual objects which correspond to the real objects but are more diverse.

Subsequently, pure virtual objects 230,230' not present in the play ground 100, 100', 100" which is an actual space are produced. These virtual objects include background buildings 230 (see FIG. 2) or virtual exhibits fixed in the virtual space 200,200' and moving virtual characters 230' (see FIG. 4). These pure virtual objects are produced through a general designing work. In addition, the virtual object, particularly the moving virtual character, is programmed to move in response to a behavior or motion of the user 10. This is performed through a general interactive game programming work.

The image data of the virtual space configured as above is stored in the memory of the control unit 500 together with a game program or an exhibition program, thereby completely preparing the virtual space which is usable in the virtual reality system of the present disclosure.

Next, a method for enjoying the virtual reality system of the present disclosure, namely operations of the present disclosure, will be described.

First, the user 10 wears the head mounted device 300 and necessary sensors 400, and before starting a game or viewing in earnest, the calibration process described above is performed. In other words, if the user stands toward the front or in a predetermined direction at an entrance of the play ground 100, 100', 100" or any other given location for a predetermined time, the control unit 500 harmonizes the coordinate axis of the actual space 100, 100', 100" with the coordinate axis of the sensor 400.

If the user 10 starts a game or viewing in earnest, namely if the user 10 makes a movement or motion in the play ground 100, 100', 100", the control unit 500 calculates an actual location and a facing direction (or, a gazing direction) of the user, namely the head mounted device 300, from signals input from the sensor 400. Subsequently, if the actual location and direction of the head mounted device 300 is calculated, a virtual space image observed at the same location and in the same direction in the virtual space 200,200' having the same structure and size is generated and displayed on the display of the head mounted device 300. This process for generating an image of the virtual space is identical to a three-dimensional animation producing process, in which a virtual camera is disposed at the above location to face the above direction in the constructed virtual space and an image of the virtual space within a vision field of the virtual camera is captured. At this time, if the system displays a three-dimensional image, a left eye image and a right eye image are captured respectively from two virtual cameras spaced apart as much as a distance between left and right eyes. In addition, a magnification of the virtual camera is adjusted so that a size of an object observed by the eyes of a human in the actual space at the same location and in the same direction becomes identical to a size of the virtual object in the image captured by the virtual camera. In addition, when the image of the virtual space is captured, illumination effects may be suitably applied so that the virtual space may be decorated more diversely.

The captured image of the virtual space observed at the current location and in the current direction of the user 10 is displayed on the display of the head mounted device 300. At this time, sound effects or the like may be added to enhance the immersion and reality of the virtual space.

After that, in real time or whenever a motion of the head mounted device 300 is sensed, a process of calculating an actual location and a facing direction of the head mounted device 300 and a process of generating an image of the virtual space 200,200' corresponding thereto and displaying the image on the display are repeated, so that a motion or movement of the user 10 in the play ground 100, 100', 100" is synchronized with a motion or movement in the virtual space 200,200'.

Meanwhile, according to a progression of a game program or the like and a behavior or motion of the user 10 sensed by the sensor 400, a virtual character may appear in the virtual space and is interactively changed according to the behavior or motion of the user.

By doing so, in the present disclosure, the immersion in a virtual space can consist with the actual movement in an actual space, and the immersion and reality may be maximized.

Meanwhile, since humans have very developed sight, a three-dimensional display technique is inferior to the human sight even though it has been greatly developed recently. Therefore, in an embodiment of the present disclosure, an eye tracking technique is utilized to enhance the reality of the virtual space further.

Figure 8:
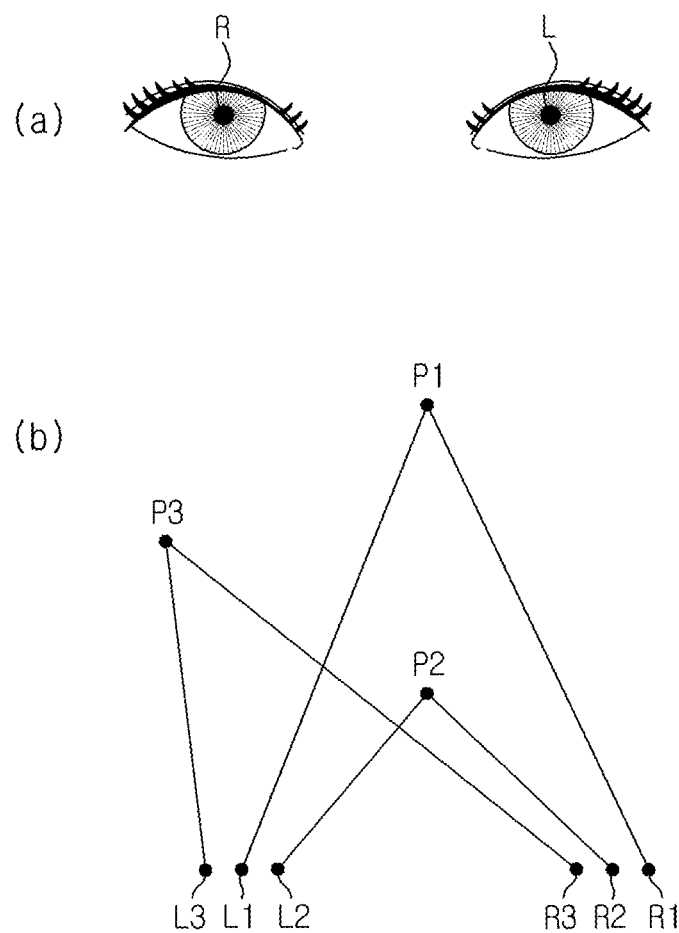
FIG. 8 is a diagram for illustrating an eye tracking function applied to the virtual reality system according to an embodiment of the present disclosure.

The eye tracking technique detects pupils L, R of a left eye and a right eye as shown in FIG. 8a, and calculates a gazing point, which is gazed by a user, therefrom as shown in FIG. 8b.

When seeing an object, a human generally turns his/her head toward a gazing point so that the gazing point is put into a front center of the face, namely a center of the vision field. However, a human may also observe a gazing point P3 at a corner of the vision field just by rolling his/her eyeballs without turning his/her head. At this time, the pupils L, R of both left and right eyes move respectively from the centers of both eyes toward the gazing point P3 (see L3, R3).

Further, even though the gazing direction is identical, different gazing points P1 and P2 may be set when a human observes an adjacent object and a distant object. In other words, a distance between the pupils of both eyes is closer when the gazing point is close (P2) in comparison to the case when the gazing point is far (P1) (the distance decreases from L1 and R1 to L2 and R2). From the nature of the human sight, a current gazing point may be found by detecting locations of the pupils L, R of both left and right eyes.

In addition, the eye of a human adjusts a focusing distance of the eye lens according to a distance to the gazing point by controlling the eye lens thinner when seeing a distant point and controlling the eye lens thicker when seeing a close point, and a focus of an image focused on the retina changes accordingly.

Therefore, in an embodiment of the present disclosure, a gazing point of the user 10 is calculated, and when an image of the virtual space is generated from a virtual camera of the virtual space, an image having a focus at the calculated gazing point of the user is generated and displayed on the display.

For this, the head mounted device 300 includes an eye tracking unit for detecting a pupil of the user 10. In detail, the eye tracking unit includes cameras (preferably, infrared ray cameras) respectively at the front of both left and right eyes in the head mounted device 300. In addition, the control unit 500 detects locations of the pupils of both left and right eyes from the image obtained from the camera by using the image recognition algorithm described above. From the locations of the pupils of both eyes, a gazing point is calculated. Subsequently, when capturing the virtual space from the virtual camera of the virtual space, the control unit 500 generates an image focused at the calculated gazing point of the user and displays the image on the display.

By doing so, an image of the virtual space more close to the nature of the human sight may be provided, thereby enhancing the reality of the virtual space further.

Meanwhile, if the eye tracking function is applied, in the initializing step for enjoying the virtual reality system of the present disclosure, namely in the calibration step, initial locations of the pupils of both eyes of the user 10 are detected, and a gazing point is calculated based on the initial locations. At this time, the initial locations may be detected by guiding the user to gaze a plurality of points (for example, upper, lower, right and left corners and a center) in an initial image displayed on the display, and then detecting locations of the pupils of both eyes at that time.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:
1. A virtual reality system, comprising:
   a play ground defined within an actual space of a real world to have a predetermined area in which a user may walk or run;
   a head mounted device having a display for displaying a fully virtual image of a virtual space formed corresponding to real objects in the play ground and worn by the user to surround both eyes;
   at least one sensor attached to a predetermined location in the play ground, the head mounted device and/or a body of the user to sense an actual location and/or motion of the user in the play ground; and
   a processor configured to calculate an actual location and a facing direction of the user in the play ground according to a signal received from the at least one sensor, and control the head mounted device to display a fully virtual image of the virtual space, observed at the actual location and in the facing direction of the user, on the display,
   wherein when the user wearing the head mounted device actually walks or runs in the play ground, the processor controls the head mounted device to display a fully virtual image of the virtual space corresponding to the actual location and in the facing direction of the user after walking or running, wherein the at least one sensor includes:
   an emission element mounted to the head mounted device to emit an electromagnetic wave of a predetermined wavelength; and at least two detection elements installed at predetermined locations in the play ground to detect the electromagnetic wave, wherein the emission element includes two emission elements spaced apart from each other by a predetermined distance, and the at least two detection element respectively sense locations of the two emission elements by detecting both of electromagnetic waves emitted from the two emission elements, and wherein the processor calculates locations of the two emission elements, respectively, according to signals input from the at least two detection elements, calculates a center point of the locations of the two emission elements as a current location of the head mounted device, and calculates a direction of a perpendicular bisector at the locations of the two emission elements as a current facing direction of the head mounted device.

2. The virtual reality system according to claim 1, wherein the processor controls the head mounted device to further display an image of a virtual object, not present in the play ground, to the fully virtual image of the virtual space displayed on the display.

3. The virtual reality system according to claim 2, wherein the virtual object is a virtual character which interactively moves by means of conversation with the user, education, training, fight, and/or combat.

4. The virtual reality system according to claim 2, wherein the virtual object is a virtual exhibit fixed to a predetermined location in the virtual space.

5. The virtual reality system according to claim 1, wherein the processor is implemented by a computer separated from the user and is electrically connected to the at least one sensor by means of wireless communication.

6. The virtual reality system according to claim 1, wherein the processor is implemented by a computer possessed or worn by the user.

7. The virtual reality system according to claim 1, wherein the processor is implemented by a smart phone possessed or worn by the user, and the at least one sensor is included in the smart phone.

8. The virtual reality system according to claim 1, wherein the at least one sensor includes an acceleration sensor or a gyro sensor mounted to the head mounted device, and wherein the processor calculates an actual location and a facing direction of the head mounted device according to a signal input from the acceleration sensor or the gyro sensor.

9. The virtual reality system according to claim 1, wherein the at least one sensor includes a camera sensor installed at a predetermined location in the play ground, and wherein the processor calculates an actual location and a facing direction of the head mounted device according to an image photographed by and input from the camera sensor.

10. The virtual reality system according to claim 1, wherein the at least one sensor includes a plurality of motion detection sensors respectively attached to a plurality of body portions of the user.

11. The virtual reality system according to claim 1, wherein the display includes a left eye display and a right eye display respectively corresponding to both left and right eyes of the user, and wherein the left eye display displays a left eye image which is an image obtained when the left eye of the user sees the virtual space, and the right eye display displays a right eye image which is an image obtained when the right eye of the user sees the virtual space, respectively.

12. The virtual reality system according to claim 11, wherein the head mounted device includes an eye tracking unit for detecting the pupil of the user, and wherein the processor calculates a location of the pupil of the user according to a signal input from the eye tracking unit, calculates a gazing point which is currently gazed by the user therefrom, and controls the head mounted device to display on the display an image in which the gazing point is focused.

* * * * *